FIG. 1
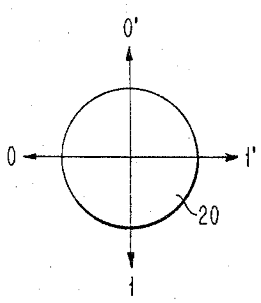
FIG. 3
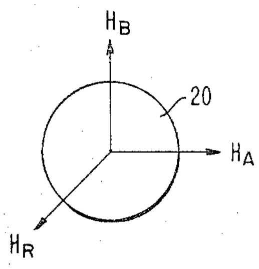
FIG. 2
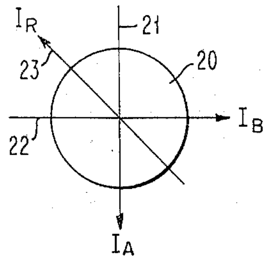
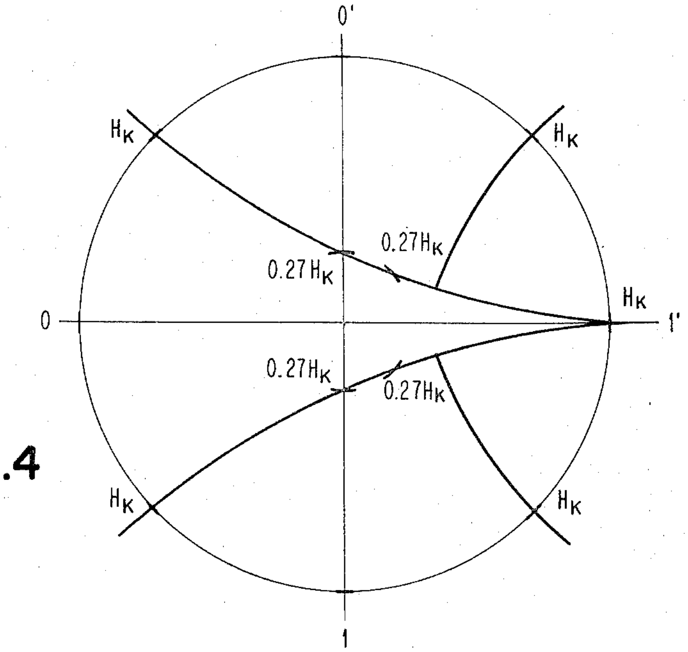
FIG. 4
EFFECT OF SINGLE FIELD PULSES
| PULSE | INITIAL STATE | 0 | 1 | 0' | 1' |
|---|---|---|---|---|---|
| A | FINAL STATE | 0 | 1' | 1' | 1' |
| B | | 0' | 1 | 0' | 0' |
| R | | 0 | 1 | 0 | 1 |
FIG. 5
INVENTOR.
HENRI J. OGUEY
BY Lester W. Clark
ATTORNEY

NON-DESTRUCTIVE READOUT MEMORY EMPLOYING BIAXIAL ANISOTROPY

Filed Feb. 12, 1964

EFFECT OF PULSE SEQUENCES

| SEQUENCE | INITIAL STATE: 0 | 1 | EFFECT |
|---|---|---|---|
| | FINAL STATE | | |
| AAA... | 0 | 1' | REPETITION OF PULSES HAS SAME EFFECT AS SINGLE PULSE |
| BBB... | 0' | 1 | |
| RRR... | 0 | 1 | |
| AR | 0 | 1 | CONSERVATION OF INFORMATION WITH TWO FLUX CHANGES: NON-DESTRUCTIVE READ-OUT |
| BR | 0 | 1 | |
| ...ABR | 0 | 0 | IRREVERSIBLE CHANGE: STORAGE OF "0" |
| ...BAR | 1 | 1 | IRREVERSIBLE CHANGE: STORAGE OF "1" |

April 16, 1968 H. J. OGUEY 3,378,824

NON-DESTRUCTIVE READOUT MEMORY EMPLOYING BIAXIAL ANISOTROPY

Filed Feb. 12, 1964 6 Sheets-Sheet 5

United States Patent Office 3,378,824

Patented Apr. 16, 1968

3,378,824

NON-DESTRUCTIVE READOUT MEMORY EMPLOYING BIAXIAL ANISOTROPY

Henri J. Oguey, Oberrieden, Switzerland, assignor to International Business Machines Corporation, New York, N.Y., a corporation of New York Filed Feb. 12, 1964, Ser. No. 344,310
10 Claims. (Cl. 340—174)

This invention relates to memory apparatus for computers and the like and particularly to memory apparatus operable by non-coincident pulses and including non-destructive readout.

A memory apparatus for a computer typically consists of a plurality of memory elements, each of which is shiftable selectively between two stable states. Each stable state is arbitrarily assigned a particular significance, namely either a binary 1 or a binary 0. Each element in the memory is operatively connected to a plurality of input lines, sometimes referred to as write lines and to at least one output line, sometimes referred to as a read line. Information is selectively stored in the memory elements by pulses transmitted along the input lines. In order to determine the information stored in the memory, other pulses are sent along the input lines in a manner to cause the production of pulses in the output line. The memory is then said to be read out.

Most memories of the prior art require, for selective reading or writing, pulses supplied simultaneously to a plurality of input lines. Data may flow through a computer either as a series of successive bits or pulses in a single channel or as coincident pulses in parallel channels. In order to control such a memory from a succession of series pulses, some apparatus is required to translate the series of timed pulses into coincident or parallel pulses. In order to avoid the necessity of such translating apparatus, memories have been proposed which operate on non-coincident pulses on the input lines. Such memories of the prior art have typically been nearly as complicated as the translating apparatus which they are designed to eliminate.

In any memory, it is desirable that the reading out operation be effective without changing the stable state of the individual elements from which the information is read out. Such an operation is referred to as non-destructive readout. Those memories of the prior art which have been constructed to operate on non-coincident pulses have not had the property of non-destructive readout. On the contrary, in such memories, any data readout must be re-written into the memory, or it will be lost.

There is disclosed in the application for United States Letters Patent of Emerson W. Pugh, Ser. No. 102,184, filed Apr. 11, 1961, now Patent No. 3,071,756, entitled "Magnetic Memory," a memory in which each element is a region of a thin magnetic film having biaxial anisotropic characteristics. In other words, each memory element is a region of thin magnetic film having two easy axes of magnetization separated by an angle of 90°. Furthermore, there is disclosed in the copending application of John C. Slonczewski, Ser. No. 175,603, filed Feb. 26, 1962, entitled, "Magnetic Storage Elements," another form of magnetic memory apparatus utilizing thin film magnetic elements having biaxial anisotropy.

The present invention has particular utility in connection with thin film memories wherein each element is a magnetic region having biaxial anisotropic characteristics, although the invention in its broader aspects is not limited to the use of such memory elements.

An object of the present invention is to provide an improved memory apparatus wherein selection of the elements for reading and writing is accomplished by non-coincident pulses, and wherein the data stored in the memory may be read out non-destructively.

Another object of the invention is to provide an improved memory apparatus, wherein each of the elements comprises a tetrastable region of a thin magnetic film.

Another object is to provide an improved memory apparatus of the type described, wherein the magnetic memory elements exhibit biaxial anisotropy and wherein clearing of the data is not necessary prior to writing.

A further object is to provide an economical, high speed, compact memory apparatus employing as memory elements thin film regions of magnetic materials exhibiting biaxial anisotropic characteristics.

Another object is to provide, in connection with memory apparatus employing tetrastable memory elements, improved non-coincident pulse sequences for writing into the memory and for reading the memory with non-destructive readout.

The foregoing and other objects of the invention are obtained in the embodiments described herein. In the first embodiment described, the memory elements are thin film magnetic elements having biaxial anisotropy and are therefore tetrastable. In this embodiment, the memory elements are arranged in a two dimensional array, which has two arrays of word and bit drive lines and a single reset drive line. In another embodiment, the memory elements are arranged in a three dimensional array and are provided with two arrays of word and bit drive lines and two arrays of reset drive lines. A third embodiment of the invention is disclosed in which each memory element is a tetrastable logic circuit.

In order to write data into a memory element, the word and bit drive lines are successively pulsed and the reset drive line is then pulsed. The particular binary bit of information written by such a sequence depends upon the sequence of energization of the word and bit drive lines.

In order to read out information from such a memory element, one of the word and bit drive lines is pulsed, followed by a pulse on the reset drive line. Selection of a particular element for reading is accomplished by reading a drive line of the array other than the one pulsed, or a separate physically parallel read line.

Other objects and advantages of the invention will become apparent from a consideration of the following specification and claims, taken in connection with the accompanying drawings.

In the drawings:

FIGURE 1 is a diagrammatic illustration of a single magnetic film memory element having biaxial anisotropic characteristics.

FIG. 2 is a diagrammatic illustration of the thin film magnetic element and the drive lines therefor, showing the relative directions of the various drive lines;

FIG. 3 is a diagrammatic illustration of the direction of the magnetic fields supplied by the drive lines;

FIG. 4 is a graphical illustration of the effect of magnetic fields of varying magnitude, and direction on a thin film memory element of the type shown in FIG. 1;

FIG. 5 is a table showing the effects on the memory element of FIG. 1 of single field pulses along one of the lines illustrated in FIG. 2;

FIGS. 1–3

Figure 6:
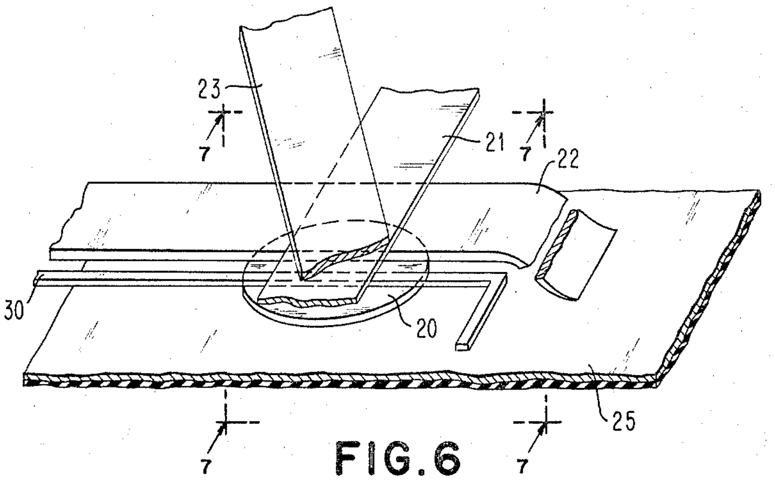
FIG. 6 is an exploded perspective view of a thin film magnetic element having biaxial anisotropic characteristics, together with the drive lines associated with that element.
Figure 7:
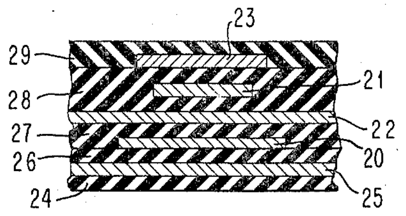
FIG. 7 is a vertical cross-sectional view taken along the line 7—7 of FIG. 6.

FIG. 1 shows a thin film magnetic memory element 20 having biaxial anisotropic characteristics. The two easy axes of magnetization of the element 20 are illustrated as the horizontal axis and the vertical axis of FIG. 1. Along either of these two axes, the element 20 may be magnetized easily in either direction. When so magnetized, it tends to retain that direction of magnetization along that axis until a stronger magnetizing force is applied along one of the other axes, as described more completely below in connection with FIG. 4.

In FIG. 1, magnetization in a direction toward the left along the horizontal axis has been assigned the arbitrary binary value 0. Magnetization downward along the vertical axis is assigned the arbitrary binary value 1. Magnetization to the right along the horizontal axis is assigned the value 1′. Magnetization upwardly along the vertical axis is assigned the arbitrary value 0′.

When the magnetic memory element 20 is employed in a binary system, the two directions of magnetization here identified as 0 and 0′ have the same binary significance, and the two directions 1 and 1′ have the opposite binary significance.

FIG. 2 shows the magnetic memory element 20 in association with three drive wires 21, 22, 23, which are utilized to change the direction of its magnetization.

FIG. 3 shows the direction of the magnetic fields produced by current flowing in the wires 21, 22, and 23 of FIG. 2. The currents indicated as $I_A$, $I_B$ and $I_R$ in FIG. 2 respectively produce the fields $H_A$, $H_B$ and $H_R$ of FIG. 3.

FIG. 4

This figure is a graphical illustration of the conditions existing in the magnetic memory element 20 when it is magnetized in one direction along one of its easy axes of magnetization, and indicates the relative values of field strength required to change its magnetization from that one axis and direction to each of the other easy axes and directions. In FIG. 4, the memory element 20 is considered as being magnetized in the 0 direction of FIG. 1. In order to reverse the direction of magnetization so that it will be magnetized in the 1′ direction, it is necessary to apply to the magnetic element 20 a field of strength $H_k$. On the other hand, the direction of magnetization in the element 20 can be switched from the zero direction to either the 1 direction of the 0′ direction by a weaker magnetic field of strength equal to $0.27H_k$.

FIG. 5

This table illustrates the effect of single pulses on one of the lines 21, 22 and 23 upon each of the four directions of magnetization shown in FIG. 1. The top line, marked "Initial State," shows one of the directions of magnetization according to FIG. 1. The lower lines show how that direction of magnetization is changed by single pulses along the A, B and R lines respectively. In each case, each signal pulse is considered to produce a magnetic field having a strength greater than $0.27H_k$ and less than $H_k$. It should be remembered that the diagram of FIG. 4 is drawn for the initial state of magnetization in the 0 direction. For any of the other three directions of initial magnetization, the diagram of FIG. 4 should be rotated correspondingly.

For example, considering the element 20 as initially magnetized in the 0 direction, then a pulse on the A line produces a magnetic field in the $H_A$ direction shown in FIG. 3, which is directly opposite to the 0 direction, but is smaller than the $H_k$ magnetic field necessary, according to FIG. 4, to reverse the direction of magnetization. Consequently, the magnetization remains in the 0 direction as shown in the A line of the table of FIG. 5 in the first column.

Again, consider that the magnetization starts in the 0 direction and that a pulse is applied on the B line 22 of FIG. 2, a field is produced acting vertically upward as shown at $H_B$ in FIG. 3. This pulse, being greater than 0.27K, is effective to rotate the direction of magnetization of the element through 90°, to the 0′ direction shown in FIG. 4. This is illustrated by the appearance of 0′ in the first column of FIG. 5 in the B line.

As another example, the pulse in the R line 23 of FIG. 2 produces a magnetic field in the direction $H_R$ of FIG. 3, but is ineffective to change the direction of magnetization since its field strength is less than $H_k$. As shown in FIG. 4, a pulse with a field strength greater than $H_k$ would be necessary to shift the direction of magnetization from the 0 direction. Consequently, the 0 direction is entered in the first column of FIG. 5 in the R line.

The other columns of FIG. 5 may be similarly derived from other orientations of the diagram of FIG. 4.

FIGS. 6–7

These figures illustrate the physical construction of a memory unit utilizing memory elements of the type shown diagrammatically in FIGS. 1 to 3. The memory unit is illustrated as being supported on a base layer 24 of electrical insulating material covered by a layer of metal 25, which should be a good conductor such as aluminum, silver or copper, and which serves as a ground plane. Upon the ground plane 25 is a layer of insulating material 26 upon which are supported in spaced relation a plurality of discs 20 of magnetic material, only one of which is shown in the drawing. Another layer 27 of insulating material extends over the discs 20. The insulating layers are omitted in FIG. 6, for purposes of clarification. Superimposed above the layer 27 are the three drive lines 22, 21, 23, each insulated from the other by suitable layers of insulation 28 and 29. The particular order in which the three drive wires 21, 22, 23 appear above the magnetic element 20 is not material. If a separate readout line is required, it may be provided as shown at 30 in FIG. 6, parallel to the drive line 22. Alternatively, the drive line 22 may be used as a readout line. As another alternative, either the drive line 21 or another line parallel to it could be used as the readout line.

The magnetic elements 20 may, instead of being separate discs, be a part of a continuous magnetic sheet, in which case, the size of each element 20 is determined by the region where all of the three drive lines 21, 22, 23 produce a sufficient magnetic field to control the direction of magnetization in the sheet.

Magnetic elements exhibiting a biaxial anisotropic characteristic may be fabricated by employing the natural anisotropy characteristics of crystallographically oriented materials.

Crystallographically oriented magnetic thin films exhibiting a biaxial anisotropic characteristics may be grown epitaxially on NaCl, MgO, or the similar single crystal materials. Well oriented films 1 cm. square may be fabricated by evaporating a nickel-iron alloy of 80% nickel-20% iron, onto such a crystal as NaCl, at temperatures ranging from 250° to 400° C. The crystal NaCl is particularly attractive since films may be floated off on water and subsequently picked up on previously prepared strip wiring arrays.

It is well known that if a sheet of thin foil of nickel-iron alloy is severely cold rolled, to about 95% reduction or more, and then recrystallized with an anneal at about 950° C., a (100) plane lies in the rolling plane with a (001) direction parallel to the roll direction, as set forth in a book entitled "Ferromagnetism," by Richard M. Bozorth, published by the D. Van Nostrand Co., Inc., pages 586–590. The cubic anisotropy of face centered Ni–Fe is such that the two easy axes are, respectively, parallel and perpendicular to the roll direction for less than about 63% nickel and are at 45° to these directions for compositions containing more than 75% nickel. Between these two compositions, the directions of the easy axes are determined by the state of ordering. The degree of alignment from one region in a sheet to another has been found to be excellent.

FIG. 8

This figure is a wiring diagram of a memory element circuit capable of performing the logic operations performed by the magnetic memory element 20 of FIGS. 1–7.

Figure 8:
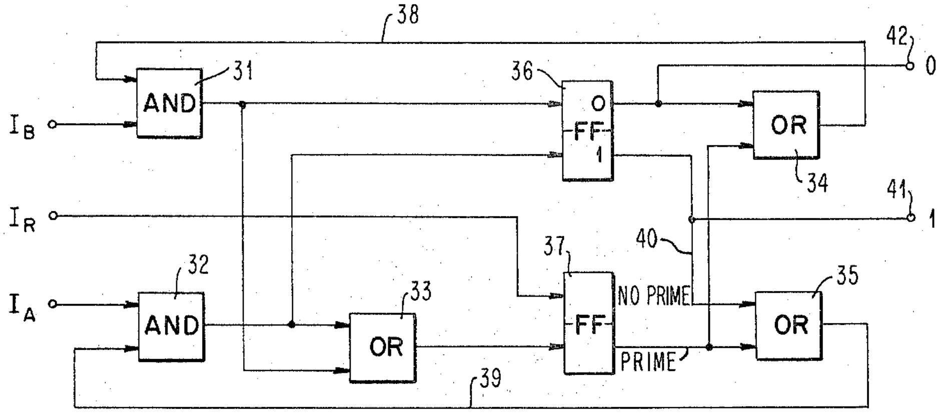
FIG. 8 is a wiring diagram of a logic circuit which is functionally the equivalent of one of the thin film magnetic elements of FIGS. 1–7.

The memory circuit of FIG. 8 includes two AND circuits 31 and 32, three OR circuits 33, 34, 35, and two bistable circuits for flip-flops 36 and 37. The bistable circuit 36 is either in a 0 state or a 1 state, as indicated by the legend of the drawing. The bistable circuit 37 is either in a "NO PRIME" state or a "PRIME" state, as indicated by the legend of the drawing.

The AND circuit 31 has two input terminals, one connected to the signal input line $I_B$ and the other connected through a wire 38 to the output terminal of OR circuit 34. The AND circuit 32 has two input terminals, one connected to the drive line $I_A$, and the other connected through a wire 39 to the output terminal of OR circuit 35.

The output terminal of AND circuit 31 is connected to a 0 input terminal of bistable circuit 36 and is also connected to one input terminal of an OR circuit 33. The output terminal of AND circuit 32 is connected to the other input of OR circuit 33 and to the 1 input terminal of bistable circuit 36. The output terminal of OR circuit 33 is connected to the PRIME input terminal of bistable circuit 37. The drive line $I_R$ is connected to the NO PRIME input terminal of bistable circuit 37. The 1 output terminal of bistable circuit 36 is connected through a wire 40 to an input terminal of OR circuit 35 and also to a 1 output terminal 41. The PRIME output terminal of bistable circuit 37 is connected to the other input terminal of OR circuit 35 and also to one of the input terminals of OR circuit 34. The 0 output terminal of bistable circuit 36 is connected to the other input terminal of OR circuit 34 and also to the 0 output terminal 42.

Referring now to FIG. 5, it may be seen that the memory element of FIG. 8, and particularly the two bistable circuits 36 and 37 thereof, are always in one or the other of the four states corresponding to the four initial states indicated at the top of Table 5. It may be further seen that each input pulse on one of the A, B and R input lines has the same effect on the stable state of the memory element of FIG. 8 as is same pulse applied to the corresponding drive line of the magnetic memory element 20.

FIG. 9

This figure shows a table illustrating the effects of various pulse sequences applied to the input lines A, B, R upon the state of the memory element 20 of FIGS. 1–7, or alternatively upon the state of the memory unit illustrated in FIG. 8.

It may be seen from the first section of this table that the repetition of a particular pulse has the same effect as a single pulse upon the state of magnetization of a memory element. Furthermore, no single pulse, nor any repetition of single pulses of the same type, is effective to change the state of magnetization of the memory element 20. Consequently, single pulses and sequences of single pulses of the same type are not effective to destroy or change the data stored in the memory. It should be noted that while an A pulse is effective to change a stored 1 to a stored 1′, it has been stated above that the 1 and 1′ states of the memory element are considered to have the same binary significance.

Figures 9, 10:
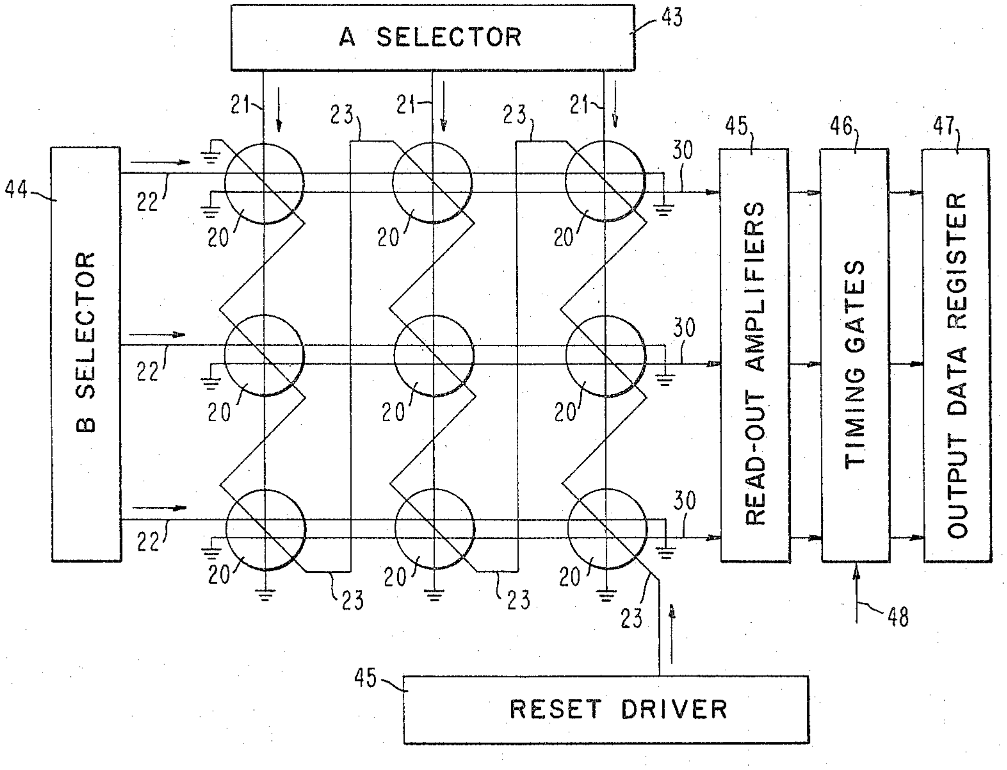
FIG. 9 is a table showing the effects of various pulse sequences along the drive lines upon the information stored in the magnetic memory element.
FIG. 10 is a wiring diagram of a two dimensional memory embodying thin magnetic film elements of the type described in connection with FIGS. 1–7.

Considering the second section of the table in FIG. 9, it may be seen that a sequence of two pulses, the first being on either the A or B line and the second on the R line is ineffective to change the initial state of magnetization of the memory element, but that during the sequence, there are two flux changes in the memory element, which flux changes may be sensed for read out purposes. Consequently, these sequences may be used for non-destructive read out purposes.

The third section of the table in FIG. 9 illustrates the pulse sequences applied for in writing into the memory element. The pulse sequence A, B, R, is employed to write a 0 and the pulse sequence B, A, R, is employed to write a 1. It should be noted that the pulse A, B, R, always writes a 0 regardless of the previous state of magnetization of the element, and that the pulse sequence B, A, R, always writes a 1, regardless of the previous state of magnetization. Furthermore, any longer pulse sequence, employing an R pulse only at the end will write a 0 or a 1, depending only upon the sequence of the last three pulses. Thus, for example, A, B, A, R writes a 1.

FIG. 10

This figure illustrates a two dimensional memory including nine magnetic memory elements of the type described in connection with FIGS. 1–7.

The A input lines 21 are connected to an A line selector 43, by which A pulses are selectively addressed over one or the other of the several lines 21. The B input lines 22 are similarly connected to a B line selector 44. The reset drive line 23 is connected to a reset driver 45. Readout lines 30 are provided connected through readout amplifiers 45 and timing gates 46 to an output data register 47.

The memory elements 20 are arranged in rows and columns. Each A line 21 is coupled to all of the memory elements 21 in one column, and each B line 22 is coupled to all of the memory elements in one row. The reset line 23 is coupled to all of the memory elements in all of the rows and columns. Each output line 30 is coupled to all of the memory elements 20 in one row.

In the writing operation, a particular one of the elements 20 is selected by the A selector 43 and the B selector 44, and pulses are sent in sequence over the respective A and B lines coupled to that particular element, followed by a pulse from the reset driver 45. The particular sequence selected, i.e., A, B, R or B, A, R, determines whether a 1 or a 0 is written. The desired data memory form is thereby selectively written into the selected memory element 20.

Figure 11:
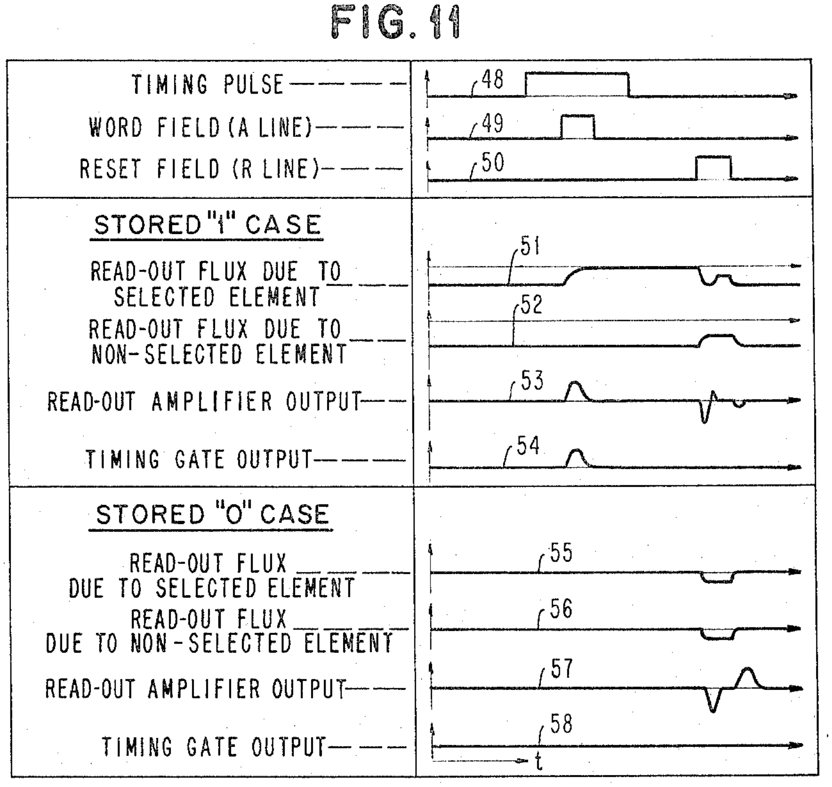
FIG. 11 is a table showing the effects of various pulses in the memory apparatus of FIG. 10 during the nondestructive readout operation.

The non-destructive read out operation is illustrated in FIG. 11. The operation of reading out from a particular memory element 20 is accomplished by the timing pulse shown in 48 in FIG. 10, which opens the timing gate 46 associated with the readout line 30 coupled with the particular memory element 20 whose data is to be read out. While the timing gate is opened by the pulse 48, a word pulse is supplied to the A line coupled to the same memory element 20. Such a pulse is illustrated in line 49 in FIG. 11. Note that the selection of one timing gate and one A line 21 completes a selection of a particular memory element 20 to be read out. After the termination of the timing pulse 48, a reset pulse, as shown in line 50, is supplied to the reset lines 23.

If the selected memory element 20 contains a stored 1 at the beginning of the readout operation, then the flux acting on the readout line 30 due to the magnetic field of the selected memory element 20 appears as shown at 51 at FIG. 11. It may be seen that the flux changes from an initial negative value to substantially zero concurrently with the A pulse 49, at which time the memory element 20 shifts from its 1 state to its 1' state. Later on, concurrently with the pulse 50 in the reset line, the flux changes from 0 to the negative value indicative of the stored 1 state. This change is accompanied by certain transient effects.

The curve in line 52 illustrates the variation of the flux acting on the selected readout line 30 due to the non-selected elements 20. Note that there is no change in the flux due to these elements at the time of the A pulse, but only at the time of the reset pulse 50.

The signal at the output of the readout amplifier 45 is illustrated at 53. The output signal at the output of the timing gate 46 is illustrated at 54. Note that the timing pulse 48 has terminated before the reset pulse 50 begins, so that the only signal appearing at the timing gate output and transferred to the output data register 47 is a pulse corresponding to the leading edge of the pulse in the A line, as shown in 49. The data register is arranged to interpret such a pulse as a binary 1.

FIG. 11 illustrates the conditions in the output of the memory in the case where the data stored in the selected memory element 20 represents a 0. In this case, the flux acting on the selected output line 30 due to the selected element 20 is illustrated at 55. Since the magnetic flux applied by the A line 21 is in direct opposition to the stored magnetic flux representing the binary 0, it is not sufficiently large to reverse that stored flux, and, there is no change of the flux acting of the selective output line 30 at the time of the A pulse 49. A transient pulse appears in line 30 at the time of the reset pulse 50. The magnetic flux acting on the selected read out line 30 due to the non-selected elements is shown at 56, which is essentially the same as the line 55, and shows only a transient response at the time of the reset pulse 50. The read out amplifier output is shown at 57, and the timing gate output is shown at 58, and consists simply of a flat curve with no pulse and hence a 0 indication to the data register 47.

Thus, it may be seen that the apparatus may be read out without destroying the stored data while providing a clear distinction between a stored 0 and a stored 1.

For clarification of the drawings in FIG. 10, all of elements 20 have been shown with their magnetic directions of the same binary significance oriented in the same way. Such an orientation results in a meandering path for the reset lines 23. Other configurations may be used, for example, the elements 20 of one row have their orientations reversed with respect to the adjacent row, thereby enabling the shortening of the reset line 23 appreciably. Many systems of arranging the orientation of the respective memory elements 20 may be devised. It is pointed out that the present invention is not limited to any such specific orientation arrangement.

FIGS. 12–15

Figure 12:
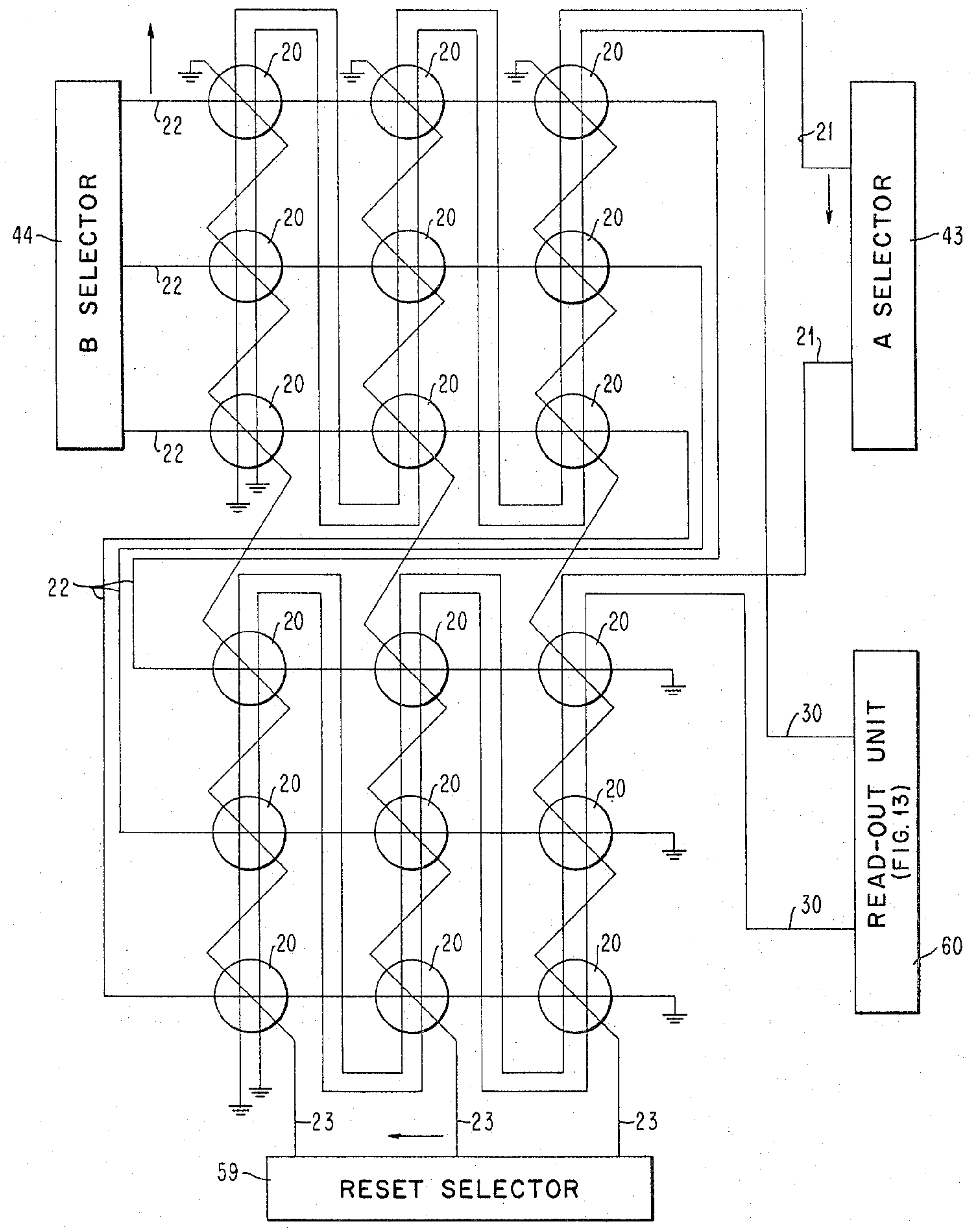
FIG. 12 is a wiring diagram of a three dimensional memory apparatus embodying the invention.

FIG. 12 illustrates a three dimensional array of memory elements 20, including upper and lower groups of nine elements each. Each of the upper and lower groups represent a separate plane in a three dimensional array of elements. The two groups are shown on a single plane in FIG. 12 to facilitate presentation in the drawing.

The array of A drive lines 21 is somewhat different in FIG. 12 than in the previous figures. A single A drive line 21 is coupled with all of the elements 20 in each of the two planes. In that respect, the A drive lines in FIG. 12 correspond more nearly to the R drive line of FIG. 10, than to the A drive lines of that figure. Three separate reset drive lines 23 are used in FIG. 12, where only one reset drive line 23 is used in FIG. 10. The reason for rearranging the A drive lines and the R drive lines in the three dimensional memory is to prevent either destructive or a series read out instead of the desired nondestructive read out.

Figure 13:
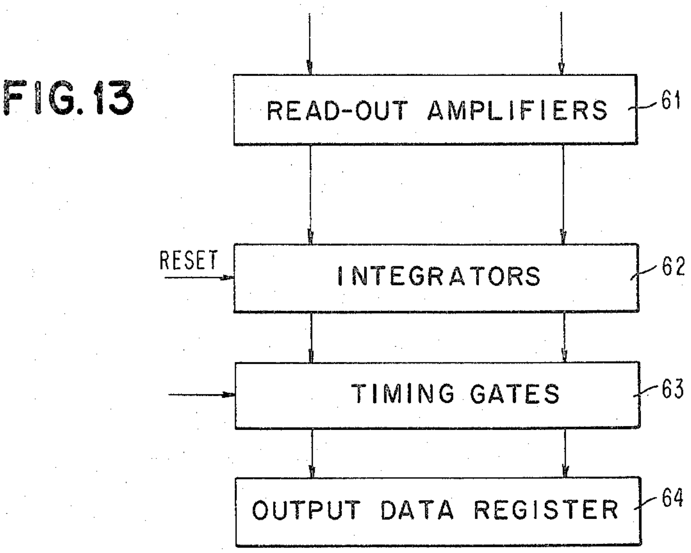
FIG. 13 is an expanded block diagram showing the essential elements in a read out unit shown as a single block in FIG. 12.

The read out lines 30 in FIG. 12 lead to a read out unit illustrated as a single block in that figure at 60. The read out unit 60 is illustrated in somewhat more detail in FIG. 13. The read out unit is there shown as consisting of a set of read out amplifiers 61, a set of integrators 62, a set of timing gates 63, and an output data register 64.

Figure 14:
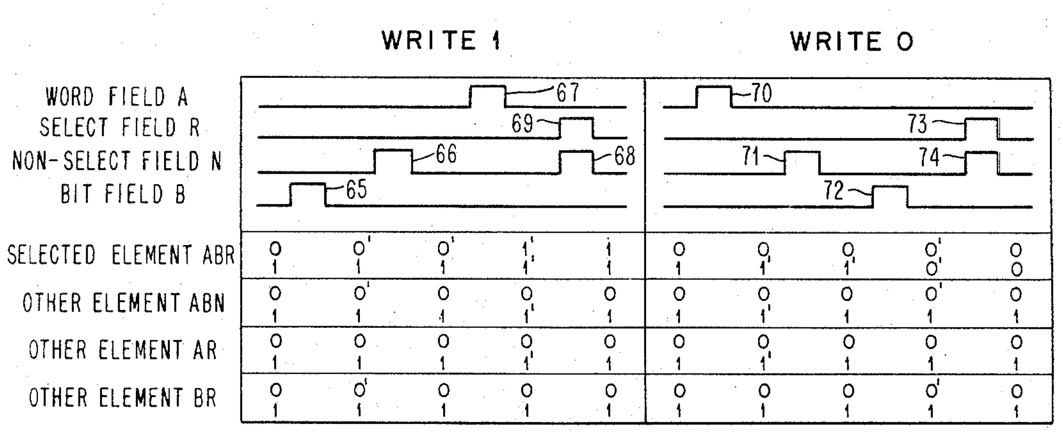
FIG. 14 is a graphical and tabular illustration of the writing operation in the memory of FIG. 12.

The pulse sequences used for writing operations in the memory of FIG. 12 are illustrated in FIG. 14. In order to write a 1 in a particular memory element 20, which may be the element indicated by the legend ABR in FIG. 12, a pulse is first sent through the B line 22 associated with a particular element 20, such a pulse being shown at 65 in FIG. 14. The pulse 65 is illustrated by a graphical legend labelled "Bit Field B" in FIG. 14. In the table of columns appearing below the graphical section of FIG. 14, there are shown the states of magnetization of four different memory elements in the array of FIG. 12 at the times preceding and following the particular drive pulses which are shown above in the graphical sections. For example, the column to the left of the pulse 65 shows the states preceding that pulse, and the column to the right of pulse 65 shows the states after that pulse. Four typical memory elements are selected, being those identified by the legends ABR, ABN, AR and BR in FIG. 12. For each of these four elements, the sequence of changes in its states of magnetization are illustrated for each two initial conditions. For each element, the top line illustrates the sequence of states beginning with an initial magnetization state 0 and the lower line illustrates the sequence of states beginning with an initial magnetization state 1.

After the bit field selecting pulse 65 is applied to one of the B lines 22, a nonselecting pulse 66 is applied to all of the reset lines 23 excepting the one line which is coupled to the selected memory element ABR. A word select pulse is next applied to one of the A lines, as illustrated at 67 in FIG. 14. Thereafter, pulses are supplied to all of the reset lines 23, a pulse 68 to the lines associated with the nonselected elements, and a pulse 69 to the line 23 associated with the selected element.

By referring to the table at the bottom of FIG. 14, it may be seen that this sequence of pulses in the drive lines is effective to write a 1 in the selected element ABR, regardless of whether the initial state of that element was 0 or 1. Furthermore, the other elements ABN, AR and BR are not affected by the writing sequence. Whatever their state of magnetization at the beginning of the sequence, it remains the same at the end.

The sequence of pulses for writing a zero is shown graphically at the top of FIG. 14 in the right hand section thereof. The table at the bottom of FIG. 14 in the right hand section shows the change of state of the four typical memory elements during the write 0 sequence. The first pulse with 0 sequence is a pulse 70 of the A line. The second pulse is a pulse 71 on all the lines 23 other than the one coupled to the selected element ABR. The next pulse is a pulse 72 on the B line 22 coupled to the selected element ABR. Finally, pulses 73 and 74 are sent on the lines 23. Pulse 73 represents the pulse on the line 23 coupled with the selected element ABR. Pulse 74 represents the pulses on the other lines 23.

Referring to the table in the lower right section of FIG. 14, it may be seen that this pulse sequence is effective to write a zero in the selected element ABR, regardless of the initial state of its magnetization. Furthermore, this sequence does not affect the state of any element other than the selected element, regardless of the initial state of magnetization of those other elements.

Figure 15:
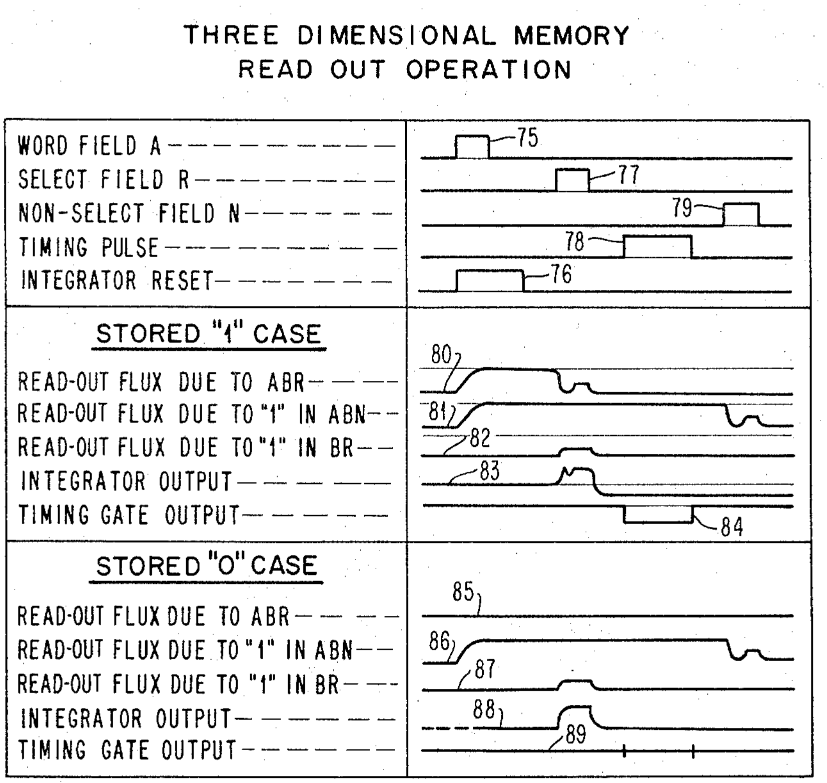
FIG. 15 is a graphical illustration of the read out operation in the memory of FIG. 13.

FIG. 15 illustrates graphically the sequence of read out pulses for one of the selected elements 20 in the memory unit of FIG. 12. Again, the selected element may be assumed to be the element identified as ABR in FIG. 12.

The first pulse in the sequence is a pulse 75 sent over that one of the A lines 21 in FIG. 12 which is associated with the selected element ABR. Concurrently with that A pulse, the integrator 62 connected to the output line 30 which is coupled to the selected element ABR is supplied with a reset pulse shown at 76 in FIG. 15. Pulse 76 continues for a time after termination of pulse 75. Thereafter, a pulse 77 is supplied to the reset line 23 coupled to the selected element ABR and then a timing pulse 78 is sent through the timing gate 63 associated with the output line 30 of the selected element ABR. Finally, a reset pulse 79 is directed to those reset lines 23 which are not coupled to the selected element ABR.

If the selected element ABR has a binary 1 stored in it, then the flux acting on the read out line 30 because of that stored one follows a variation indicated by the curve 80 in FIG. 15. Specifically, there is a positive change in flux concurrently with the A pulse 75 and a negative change in flux concurrently with the select R pulse 77.

The curve 81 in FIG. 15 shows the variation in flux acting on the read out line 30 due to the change in magnetization in the nonselected element ABN of FIG. 12. It may be seen from the curve 81 that this flux goes through a positive change at the time of the A selecting pulse 75 and a negative change at the time of the nonselecting reset pulse 79.

The curve 82 shows the flux acting on the read out line 30 due to a 1 stored in one of the nonselected elements BR. It may be seen that this change in flux appears simply as a brief transient concurrent with the select field pulse 77.

The integrator is inactive during the period of its reset pulse 76. At the termination of the reset pulse 76, it begins to integrate the voltages produced by induction, which are proportional to the time derivative of the sum of the fluxes represented in the curves 80, 81 and 82. The resulting integrator output signal is illustrated at 83 in FIG. 15. It shows a positive excursion beginning with the select field pulse 77 and thereafter a somewhat greater negative excursion, after which the integrator output remains constant at a negative value. This variation is caused by the fact that the lines 82 represent equal positive and negative excursions and therefore have no net effect on the final integrator output, whereas the line 80, which is being summed with the lines 81 and 82 has only a negative excursion during the interval when the integrator is sensitive, so that its negative excursion dominates the positive and negative changes in the lines 82, producing a net resultant negative output of the integrator.

Since the integrator output is negative when timing gate is opened by the puse 78, there results an output pulse 84 from the timing gate which is transmitted to the output data register 64. The register 64 is designed to recognize such an output pulse as a 1.

In the case where the data stored in the selected element ABR is a 0, then the read out flux acting on the line 30 due to that data is 0 at all times, as indicated by the line 85 in FIG. 15. At the same time, a 1 stored in the element ABN will produce an output flux similar to that of a curve 81, as shown in curve 86 in FIG. 15. If a 1 is stored in a nonselected element BR, then the read out flux from that element appears as shown by the curve 87 in FIG. 15.

During the interval when the integrator is sensitive after the termination of the reset pulse 76, the only signals appearing at the integrator input are those due to the line 87, since the flux shown by lines 85 and 86 are constant at this time. Since the positive and negative excursions of the line 87 are equal, the integrator output, shown at 88, has corresponding positive and negative excursions of equal value, resulting in a net integrator output of zero at the time when the timing gate 63 opened by the pulse 78. Consequently, the timing gate output is also zero, as illustrated at 89 in FIG. 15.

While I have shown and described the certain preferred embodiments of my invention, other modifications thereof will readily occur to those skilled in the art, and I therefore intend the invention to be limited only by the appended claims.

What is claimed is:

1. Memory apparatus, comprising:

(a) an array of pulse responsive memory elements, each having four stable states corresponding respectively to 0, 1, 0′, 1′;

(b) a first array of drive lines, each coupled to a plurality of said elements and each effective when pulsed to shift only those coupled elements in a state other than the 0 state to the 1′ state;

(c) a second array of drive lines, each coupled to a plurality of said elements and each effective when pulsed to shift only those coupled elements in a state other than the 1 state to the 0′ state; and (d) a third array of drive lines, each coupled to a plurality of said elements and each effective when pulsed to shift those coupled elements in the 0′ state to the 0 state and those coupled elements in the 1′ state to the 1 state;

(e) each said element being coupled to one and only one of the first array of drive lines, one and only one of the second array of drive lines, and one and only one of the third array of drive lines.

2. Memory apparatus as defined in claim 1, comprising:

(a) first pulse sending means for selectively sending a pulse along one of said first array of drive lines;

(b) second pulse sending means for selectively sending a pulse along one of said second array of drive lines;

(c) third pulse sending means for sending a reset pulse along one of said third array of drive lines; and (d) means for operating said several pulse sending means non-coincidently.

3. Memory apparatus as defined in claim 2 in which said operating means includes:

(a) write means for operating said several pulse sending means in a sequence including, in the order named:

(1) one of said first and second pulse sending means;

(2) the other of said first and second pulse send-means;

(3) said third pulse sending means;

(b) non-destructive readout means for operating said several pulse sending means in a sequence including, in the order named:

(1) one of the first and second pulse sending means;

(2) said third pulse sending means; and (c) readout sensing means responsive to changes in magnetization of the elements during said last mentioned sequence.

4. Memory apparatus as defined in claim 1, in which:

(a) said memory elements are biaxially anisotropic magnetic elements having their easy axes of magnetization separated by 90°;

(b) each drive line of the first array is coupled to its associated elements so as to apply thereto a magnetic field in one sense along one of said easy axes;

(c) each drive line of the second array is coupled to its associated elements so as to apply thereto a magnetic field in one sense along the other of said easy axes;

(d) each drive line of the third array is coupled to its associated elements so as to apply thereto a magnetic field in a direction bisecting the angle between the easy axes and having components opposed to the magnetic fields of said first and second arrays of drive lines.

5. Memory apparatus as defined in claim 4, in which each said element is in the form of a thin film.

6. Memory apparatus as defined in claim 1, in which:
(a) one of said arrays comprises only one drive line; and
(b) said elements are arranged in two dimensions.

7. Memory apparatus as defined in claim 1, in which:
(a) each of said arrays comprises a plurality of drive lines; and
(b) said elements are arranged in three dimensions.

8. Memory apparatus as defined in claim 3, in which:
(a) said third array comprises a drive line;
(b) said elements are arranged in two dimensions;
(c) said readout sensing means comprises:
(1) an array of sensing devices, corresponding to one of said first and second arrays of drive lines, each sensing device corresponding to one drive line and being responsive to a change in state in any one of the elements associated with said one drive line of the type produced by a pulse along said drive line;
(2) an array of output lines;
(3) timing gate means connecting the sensing devices to the respective output lines; and
(4) means operable to open the timing gate means concurrently with a pulse in said readout sequence along said one drive line.

9. Memory apparatus as defined in claim 3, in which:
(a) said third array comprises at least two drive lines;
(b) said elements are arranged in at least three dimensions;
(c) said readout sensing means comprises:
(1) an array of sensing devices corresponding to one of said first and second arrays of drive lines, each sensing device corresponding to one drive line and being responsive to a change in state in any one of the elements associated with said one drive line of the type produced therein by said readout sequence;
(2) an array of integrators coupled to said sensing devices, one integrator for each sensing device;
(3) means for resetting the integrators to a definite output level;
(4) an array of output lines, one for each integrator;
(5) an array of timing gates connecting the integrators to the respective output lines; and
(6) means operable to open the timing gate after the completion of a readout pulse sequence.

10. Memory apparatus as defined in claim 1, in which each memory element comprises:
(a) first and second AND circuits, each having first and second pulse inputs and a pulse output;
(b) means connecting said first pulse input of the first AND circuit, to one of said first array of drive lines;
(c) means connecting the first pulse input of said second AND circuits to one of said second array of drive lines;
(d) a first OR circuit having two pulse inputs and a pulse output;
(e) means connecting the two pulse inputs of said OR circuit to the respective outputs of said AND circuits;
(f) a first bistable circuit shiftable between two states respectively indicative of 0 and 1 and having a 0 pulse input connected to the output of said second AND circuit and a 1 pulse input connected to the output of said first AND circuit, said bistable circuit being responsive to pulses in its respective input lines to switch to its 0 and 1 states, respectively;
(g) said bistable circuit having a 1 output shiftable between low and high levels as said circuit switches between its 0 and 1 states, and a 0 output shiftable between high and low levels as said circuit switches between its 0 and 1 states;
(h) a second bistable circuit shiftable between two states respectively indicative of "prime" and "no prime" and having a "no prime" pulse input connected to one of said third array of drive lines, and a "prime" pulse input connected to the output of said first OR circuit;
(i) said second bistable circuit having a "prime" output shiftable between low and high levels as said circuit switches between its "no prime" and "prime" states;
(j) a second OR circuit having two inputs respectively connected to the 0 output of the first bistable circuit and to the "prime" output of the second bistable circuit, and an output connected to the second pulse input of the second AND circuit;
(k) a second OR circuit having two inputs respectively connected to the 1 output of the first bistable circuit and the "prime" output of the second bistable circuit, and an output connected to the second pulse input of the first AND circuit; and
(l) a readout line connected to the 1 output of said first bistable circuit.

References Cited

UNITED STATES PATENTS 3,071,756 1/1963 Pugh -------------- 340—174

OTHER REFERENCES

Berkowitz and Greiner, "Biaxial Magnetic Thin Film Memory System and Method of Making Films for Same," IBM TDB, June 1964, vol. 7, No. 1, pp. 66–68.

TERRELL W. FEARS, *Primary Examiner.*

B. KONICK, *Examiner.*

P. SPERBER, *Assistant Examiner.*